United States Patent [19]

Holman, Jr.

[11] Patent Number: 5,506,990
[45] Date of Patent: Apr. 9, 1996

[54] KEY LOCK SYSTEM FOR PERSONAL COMPUTER

[75] Inventor: Thomas H. Holman, Jr., Austin, Tex.

[73] Assignee: Dell USA, L.P., Austin, Tex.

[21] Appl. No.: 34,041

[22] Filed: Mar. 22, 1993

[51] Int. Cl.[6] .............................. G06F 1/24; G06F 1/26
[52] U.S. Cl. .................... 395/750; 364/DIG. 1; 307/112
[58] Field of Search ........................... 395/750, 800; 307/112

[56] References Cited

U.S. PATENT DOCUMENTS

| | | | |
|---|---|---|---|
| 4,432,049 | 2/1984 | Shaw et al. | 395/800 |
| 4,788,661 | 11/1988 | Morita | 395/750 |
| 4,890,006 | 12/1989 | Huang | 307/112 |
| 4,918,649 | 4/1990 | Nishimura | 395/750 |
| 4,992,951 | 2/1991 | Glowczewski et al. | 395/750 |
| 5,140,178 | 8/1992 | Yoshihara et al. | 307/272.3 |
| 5,249,298 | 9/1993 | Bolan et al. | 395/750 |
| 5,316,868 | 5/1994 | Dougherty et al. | 429/9 |

Primary Examiner—Jack B. Harvey
Assistant Examiner—Ayaz R. Sheikh
Attorney, Agent, or Firm—Henry N. Garrana; Michelle Turner

[57] ABSTRACT

A system for controlling the operation of computer power and reset switches. A separate key switch enables a user to selectively disable the power and reset switches of the computer. The user has the option of operating the computer in a secured mode, in which a user key is required to actuate the power and reset switches, or alternatively in an unsecured mode in which the power and reset switches operate normally. Control circuitry is connected to the switches and operates in the unsecured mode for enabling power supply and reset circuitry operating state transitions responsive to the user actuation of the respective switches. In the secured mode, the circuitry disables the power supply state transitions that normally would occur responsive to user actuation of the first switch, and disables the reset circuitry state transitions, but only from the inactive operating state to the active operating state, so the reset circuitry is prevented from remaining in a continuous reset loop.

20 Claims, 1 Drawing Sheet

KEY LOCK SYSTEM FOR PERSONAL COMPUTER

TECHNICAL FIELD

The invention relates generally to security systems for personal computers and specifically to a system having a separate key lock switch for selectively disabling the power and reset switches of a computer.

BACKGROUND OF THE INVENTION

Local area networks (LANs) having a number of distributed computer terminals, or file servers, are in widespread use in various businesses and government agencies, for example. To insure a certain level of security, as well as to prevent inadvertent or unauthorized toggling of the power and/or reset switches, file servers have been designed on which the power switch, the reset switch or both comprise mechanical key lock switches. On such computers, the power switch will usually comprise a two position key switch which is actuated between on and off positions by a key. Often, the same key switch that controls the power will have a momentary position, similar to that of a car ignition switch, for controlling reset. Conversely, it is possible that an additional key switch independent from the power switch will be provided for controlling reset. To change the power state of and/or reset the computer, the key switch or switches must be actuated with the appropriate key or keys, making inadvertent or unauthorized toggling impossible.

While some users value the security afforded by key operated power and reset switches, other users prefer to be able to change the power state of their computer or its reset without the added inconvenience of keeping up with a key. These users are less concerned with security than with the possibility that they will misplace their key and would therefore prefer unsecured power and reset switches.

Generally, all of the file servers on a single LAN will be similarly designed with regard to their switching mechanisms. Therefore, it is inevitable that some users will be dissatisfied, because they perceive their computer either to lack the desired level of security or to be inconvenient to operate. In addition, there are users who will at times desire the security of key operated power and/or reset switches and at other times prefer the facility of unsecured switches.

Therefore, what is needed is a computer power and reset switching mechanism which enables a user to select between operation in a secured mode, in which a key is needed to change the power state of the computer or its reset, or a unsecured mode, in which no key is required.

SUMMARY OF THE INVENTION

The foregoing problems are solved and a technical advance is achieved by a system for controlling the operation of computer power and reset switches in both secured and unsecured modes. In a departure from the art, a separate key switch enables a user to selectively disable the power and reset switches of the computer. The user has the option of operating the computer in a secured mode, in which a user key is required to actuate the power and reset switches, or alternatively in an unsecured mode, in which the power and reset switches operate normally.

In one embodiment, the system includes a two-position key switch that may be actuated between on (engaged) or off (disengaged) positions with a key, a power switch comprising a rocker or two position switch, a reset switch comprising a momentary switch, and control circuitry. Each of the three switches generates a digital signal, the state of which is indicative of the position (i.e., on or off) of the switch. After being debounced by appropriate debounce circuitry, the three signals are input to control circuitry embodied as a clocked programmable array logic (PAL) device. The PAL device functions as a dual state machine and includes logic for generating power supply and reset circuitry control signals in response to the states of the three input signals and the present states of the control signal outputs. The control signals are supplied to the power supply and reset circuitry of the computer for controlling the power and reset functions of the computer. In one aspect of the invention, the key switch is used for selectively disabling the power switch. When the key switch is in the engaged position, the power switch is disabled and is ineffective for controlling the application of power to the computer. When the key switch is disengaged, the power switch functions normally to power up and power down the computer, depending upon the position of the switch.

In another aspect of the invention, the key switch is used for selectively disabling the reset switch in a manner identical to that described above with respect to the power switch, with one exception. Once the reset switch enters the active state, in which it supplies a reset signal to the computer, it always returns to the inactive state when the reset switch is released regardless of the state of the key switch. This prevents the reset circuitry from being locked in a continuous reset condition, occasioned by actuating the key switch to the secured mode while simultaneously actuating the reset switch.

In an illustrative embodiment, the apparatus controls the transition of the power supply and reset circuitry of a personal computer between active and inactive operating states. The apparatus includes first and second switches for respectively transitioning the power supply and reset circuitry between the operating states. Control circuitry is connected to the switches and operates in a first unsecured mode for enabling the power supply and reset circuitry state transitions responsive to the user actuation of the respective switches. In a second secured mode, the circuitry disables the power supply state transitions that normally would occur responsive to user actuation of the first switch. Also in the second mode, the circuitry disables the reset circuitry state transitions, but only from the inactive operating state to the active operating state. Accordingly, reset circuitry transitions from the active to the inactive operating state are not impeded, thereby preventing the reset circuitry from remaining in a continuous reset loop.

A technical advantage achieved with the invention is its versatility in providing both secured and unsecured modes of operation. The invention is especially useful in a local area network environment where a variety of users require computer access.

A further technical advantage achieved with the invention is that it enables an authorized user to easily select between secured and unsecured modes of operation at any time during computer use.

A further technical advantage achieved is the relatively low cost associated with the manufacture and implementation of the invention in commercial computer products.

DESCRIPTION OF THE PREFERRED EMBODIMENT

Figure 1:
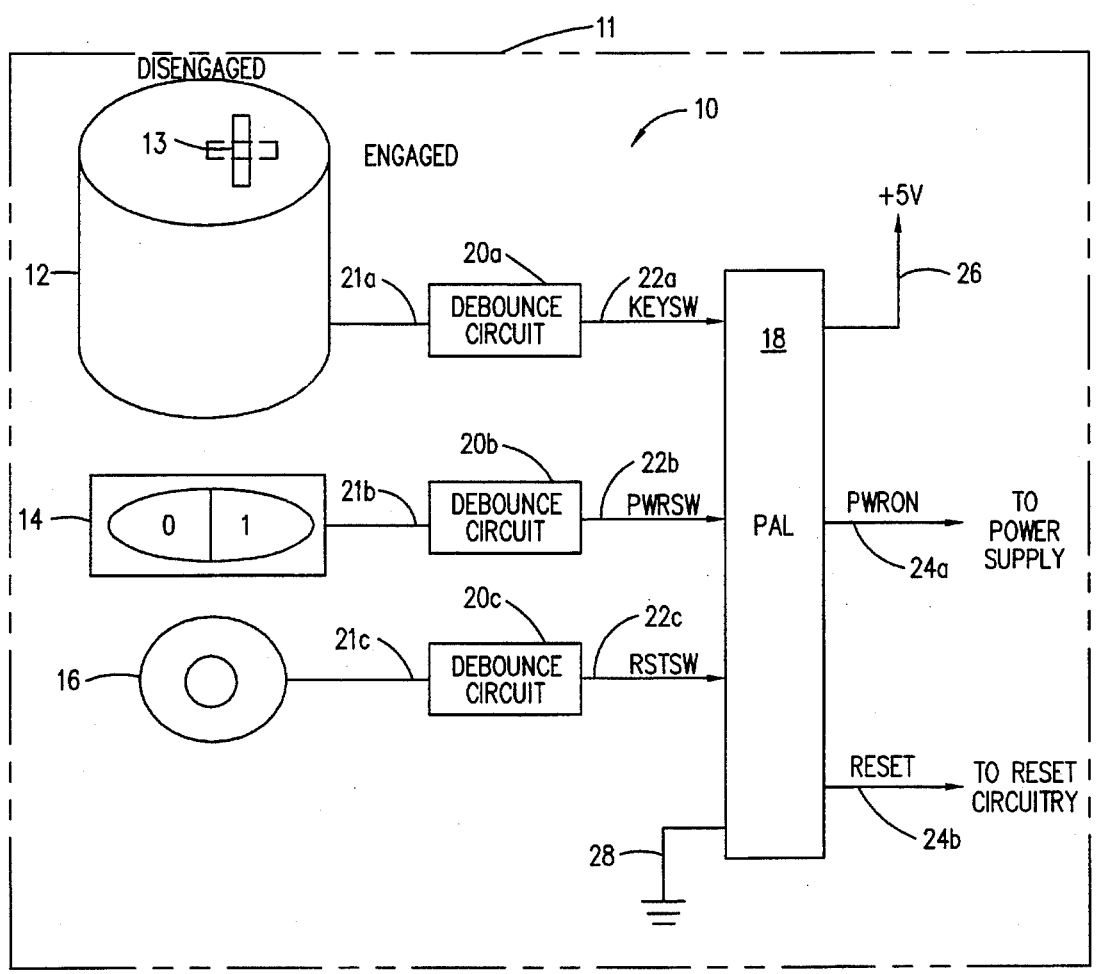
FIG. 1 is functional block diagram of a key switch regulation system embodying features of the present invention.

In FIG. 1, the reference numeral 10 designates a key switch regulation system embodying features of the present invention. The regulation system 10 is utilized to control the power and reset functions of a computer 11 and comprises a key switch 12, a power switch 14, a reset switch 16 and a programmable array logic (PAL) device 18. In a preferred embodiment, the key switch 12 comprises a standard two-position mechanical switch that is actuated between on (engaged) and off (disengaged) positions by inserting a user key (not shown) into a key slot 13 of the switch 12, and turning the key to the appropriate position. FIG. 1 illustrates the switch 12 in the disengaged position with the slot 13 oriented vertically and in the engaged position with the slot 13 (shown in phantom) oriented horizontally. The power switch 14 is a standard rocker, or two position, switch that is mechanically actuated between on and off positions by rocking the switch 14 to the desired position. The reset switch 16 comprises a momentary switch that is actuated between on and off positions by pressing and releasing the switch, respectively. Each of the above types of switches are well known in the art and therefore are not further described.

Each of the switches 12, 14 and 16 generates a digital signal, the state of which indicates the position of the switch. In the present embodiment, if the switch 12, 14 or 16 is in the on position, the signal generated thereby will be high (logic 1). If the switch 12, 14 or 16 is in the off position, the signal generated thereby will be low (logic 0). The signals generated by the switches 12, 14 and 16 are input to debounce circuits 20a–20c, respectively, via lines 21a–21c, respectively. Debounced signals KEYSW, PWRSW and RSTSW are output from the circuits 20a–20c, respectively, and input to the PAL device 18 via lines 22a–22c, respectively.

The PAL device 18 functions as a dual state machine and comprises logic for generating digital control signals PWRON and RESET responsive to the states of the input signals KEYSW, PWRSW and RSTSW and the present states of the output signals. The PWRON signal is supplied to the power supply (not shown) of the computer 11 via a line 24a for controlling the power state of the computer 11. A high PWRON signal (PWRON=1) will cause power to be supplied to the computer 11. Conversely, a low PWRON signal (PWRON=0) will cause power to be removed from the computer 11. The RESET signal is supplied to reset circuitry in the computer 11 via a line 24b for resetting the computer 11. A high RESET signal (RESET=1) will cause the computer 11 to be reset. Conversely, a low RESET signal (RESET=0) will release the computer 11 from reset.

Because the PWRON signal is a digital signal, it should be apparent that the power supply of the computer 11 must be one which can be controlled by a DC, rather than an AC, level signal. Further, it should be understood that because the PAL device 18 comprises the logic for generating a PWRON signal for initially turning on the computer 11, active power must be supplied to the PAL device 18 at all times, regardless of whether the computer 11 is on. For this purpose, the PAL device 18 is tied to a positive five volt (+5 V) power source, such as a battery (not shown), via a line 26. The PAL device 18 is further tied to ground via a line 28.

Figure 2A:
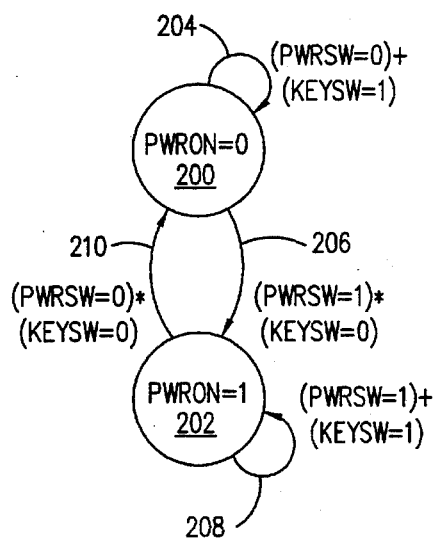
FIG. 2a is a state diagram of the PWRON output of the PAL device of FIG. 1.
Figure 2B:
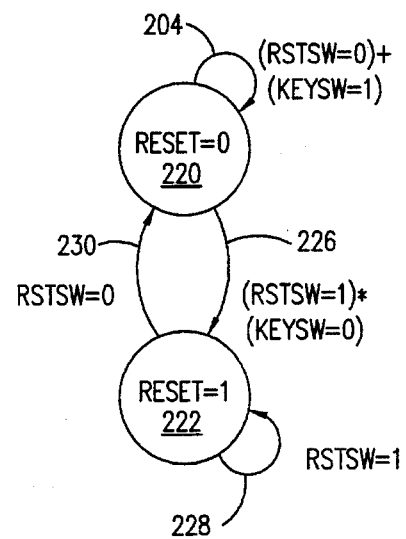
FIG. 2b is a state diagram of the RESET output of the PAL device of FIG. 1.

FIGS. 2a and 2b illustrate state diagrams of the PAL device 18 signals PWRON and RESET, respectively. It is understood that the symbols * and + represent logic operators AND and OR, respectively. In FIG. 2a, the reference numerals 200 and 202 respectively designate a first state, in which the PWRON signal is low and the computer 11 is off, and a second state, in which the PWRON signal is high and the computer 11 is on. Initially, the PAL device 18 is in the first state 200. When the PAL device 18 is in the state 200 and either the PWRSW signal is low, indicating that the power switch 14 is in the off position, or the KEYSW signal is high, indicating that the key switch 12 is engaged, the PAL device 18 follows a transition path 204 and remains in the state 200. When the PAL device 18 is in the state 200 and both the PWRSW signal is high, indicating that the power switch 12 is in the ON position, and the KEYSW signal is low, indicating that the key switch 12 is disengaged, the PAL device 18 follows a transition path 206 and transitions to the second state 202.

When the PAL device 18 is in the state 202 and either the PWRSW signal is high or the KEYSW signal is high, the PAL device 18 follows a transition path 208 and remains in the state 202. When the PAL device 18 is in the state 202 and both the PWRSW signal and the KEYSW signal are low, the PAL device 18 follows a transition path 210 and returns to the state 200.

It is apparent from the above discussion with reference to FIG. 2a that whenever the key switch 12 is engaged, the position of the power switch 14 has no effect on the power state of the computer 11 and the computer will remain in its present power state until the key switch 12 is disengaged. Conversely, when the key switch 12 is disengaged, the position of the power switch 14 controls the power state of the computer 11 and no key is needed to turn the computer on or off. The state equation for the state machine of FIG. 2a is:

PWRON=[PWRON]*PWRSW*[KEY SW]+PWRON*PWRSW+ PWRON*KEYSW with brackets indicating signals that are active low.

In FIG. 2b, the reference numerals 220 and 222 respectively designate a first state in which the RESET signal is low and a second state in which the RESET signal is high. Initially, the PAL device 18 is in the first state 220. When the PAL device 18 is in the state 220 and either the RSTSW signal is low, indicating that the reset switch 14 is in the off position, or the KEYSW signal is high, indicating that the key switch 12 is engaged, the PAL device follows a transition path 224 and remains in the state 220. When the PAL device 18 is in the state 220 and both the RSTSW signal is high, indicating that the reset switch 16 is in the on position, and the KEYSW signal is low, indicating that the key switch 12 is disengaged, the PAL device follows a transition path 226 and transitions to the state 222.

When the PAL device 18 is in the second state 222 and the RSTSW signal is high, the PAL device follows a transition path 228 and remains in the state 222. When the PAL device 18 is in the state 222 and the RSTSW signal is low the PAL device follows a transition path 230 and transitions to the state 220.

It is apparent from the above discussion with reference to FIG. 2b that when the PAL device 18 is in the second state 222, reset of the computer 11 is controlled solely by the reset switch 16. Further, whenever the reset switch 16 is released, as indicated by a RSTSW=0 signal, the PAL device 18 will return to the state 220, regardless of the position of the key switch 12. This feature prevents a user from locking the computer into a reset loop by pressing the reset switch 16 while the key switch 12 is disengaged, then engaging the key switch 12 and releasing the reset switch 16. The state equation for the state machine of FIG. 2b is:

$$RESET=[RESET]*RSTSW*[KEYSW]+RESET*RSTSW$$

with brackets indicating signals that are active low.

It is understood that the present invention can take many forms and embodiments. The embodiments shown herein are intended to illustrate rather than to limit the invention, it being appreciated that variations may be made without departing from the spirit of the scope of the invention. For example, the control logic for generating signals to the power supply and reset circuitry of the computer 11 may be implemented by discrete logic circuitry other than or in addition to the PAL device 18. Further, the system 10 may be implemented in a computer for regulating only one or the other of the power and reset switches or for regulating additional switches. Moreover, the system may be implemented in computers having power and reset signals that are further qualified, for example, with a software disable. The system may also be implemented in electronic equipment other than a computer, and the switches may be used to control various devices or components.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for controlling the transition of first and second devices each between first and second operating states, the apparatus comprising:

a first switch for transitioning said first device between said states;

a second switch for transitioning said second device between said states; and a control circuit coupled to said first and second devices and to said first and second switches, wherein said control circuit operates in a first mode for enabling said first and second switches to transition said first and second devices respectively between said states, and operates in a second mode for disabling said first switch from transitioning said first device between said states and for disabling said second switch from transitioning said second device from said first operating state to said second operating state, but still allowing said second switch to transition said second device from said second operating state to said first operating state.

2. The apparatus of claim 1 further comprising a control switch connected to said control circuit for selecting either said first mode or said second mode operation.

3. The apparatus of claim 2 wherein said control switch is key actuated.

4. Apparatus for controlling the transition of the power supply and reset circuitry of a personal computer each between active and inactive operating states, the apparatus comprising:

a first switch for transitioning said power supply between said states;

a second switch for transitioning said reset circuitry between said states; and a control circuit coupled to said power supply, to said reset circuitry and to said first and second switches, wherein said control circuit operates in a first mode for enabling said first switch to transition said power supply between said states and for enabling said second switch to transition said reset circuitry between said states, and operates in a second mode for disabling said first switch from transitioning said power supply between said states and for disabling said second switch from transitioning said reset circuitry from said inactive operating state to said active operating state, but still allowing said second switch to transition said reset circuitry from said active operating state to said inactive operating state.

5. The apparatus of claim 4 further comprising a control switch connected to said control circuit for selecting either said first mode or said second mode operation.

6. The apparatus of claim 5 wherein said control switch is key actuated.

7. The apparatus of claim 5 wherein said control switch is actuated by computer program instructions.

8. Apparatus for controlling the transition of the power supply and reset circuitry of a personal computer each between active and inactive operating states, the apparatus comprising:

a first switch responsive to user actuation for generating a first signal to transition said power supply between said states;

a second switch responsive to user actuation for generating a second signal to transition said reset circuitry between said states;

a control circuit receiving said first signal and said second signal and generating control signals for transitioning said power supply and said reset circuitry between said states, said control circuit operating in a first mode wherein said control signals are generated responsive to said first signal and said second signal to transition said power supply and said reset circuitry, respectively, between said states, and operating in a second mode wherein said control signals are not generated responsive to said first signal and are generated responsive to said second signal only for transitioning said reset circuitry from said active operating state to said inactive operating state; and a control switch connected to said control circuit and responsive to user key actuation for generating a mode signal to said control circuit to select either said first mode or said second mode operation.

9. The apparatus of claim 8 further comprising a first debounce circuit connected between said first switch and said control circuit for debouncing said first signal generated by said first switch before its receipt by said control circuit.

10. The apparatus of claim 8 further comprising a second debounce circuit connected between said second switch and said control circuit for debouncing said second signal generated by said second switch before its receipt by said control circuit.

11. The apparatus of claim 8 further comprising a third debounce circuit connected between said control switch and said control circuit for debouncing said mode signal generated by said control switch before its receipt by said control circuit.

12. The apparatus of claim 8 wherein said first switch comprises a two-position switch actuatable between a closed-contact position and an open-contact position.

13. The apparatus of claim 8 wherein said second switch comprises a momentary contact switch.

14. The apparatus of claim 8 wherein said control circuit comprises a programmable array logic (PAL) device.

15. Apparatus for controlling the transition of the power supply and reset circuitry of a personal computer each between active and inactive operating states, the apparatus comprising:

a first switch responsive to user actuation for generating a first signal to transition said power supply between said states;

a second switch responsive to user actuation for generating a second signal to transition said reset circuitry between said states;

a control circuit receiving said first signal and said second signal and generating control signals for transitioning said power supply and said reset circuitry between said states, said control circuit operating in a first mode wherein said control signals are generated responsive to said first signal and said second signal to transition said power supply and said reset circuitry, respectively, between said states, and operating in a second mode wherein said control signals are not generated responsive to said first signal; and a control switch connected to said control circuit and responsive to user key actuation for generating a mode signal to said control circuit to select either said first mode or said second mode operation.

16. The apparatus of claim 15 wherein said control circuit further operates in said second mode wherein said control signals are generated responsive to said second signal only for transitioning said reset circuitry from said active operating state to said inactive operating state.

17. The apparatus of claim 15 wherein said control switch is actuated by computer program instructions.

18. The apparatus of claim 15 wherein said control switch is key actuated by a mechanical key.

19. The apparatus of claim 15 wherein said second switch is a momentary contact switch.

20. A method for controlling the transition of a power supply and a reset circuit of a personal computer between active and inactive operating states, the method comprising:

selecting between a first mode and a second mode of operation;

generating a first signal for transitioning said power supply between said states;

generating a second signal for transitioning said reset circuit between said states;

when said first mode is selected, transitioning said power supply between said states in response to said first signal and transitioning said reset circuit between said states in response to said second signal; and when said second mode is selected, transitioning said reset circuit only from said active state to said inactive state in response to said second signal, and wherein said power supply is not transitioned between states in response to said first signal.

\* \* \* \* \*